May 30, 1961 J. F. L. DELAS 2,986,328
APPARATUS FOR THE COLLECTION AND PICKING-UP
OF ARTICLES ENTRUSTED FOR SERVICES
Filed Aug. 19, 1958 5 Sheets-Sheet 1

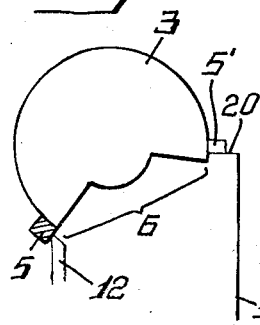 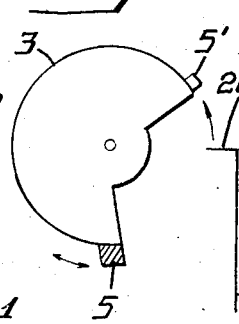 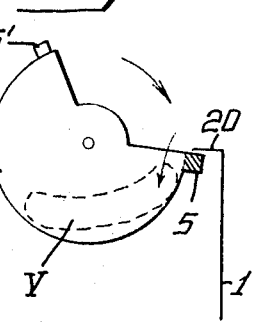
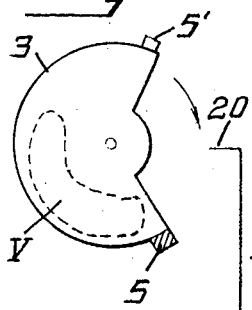 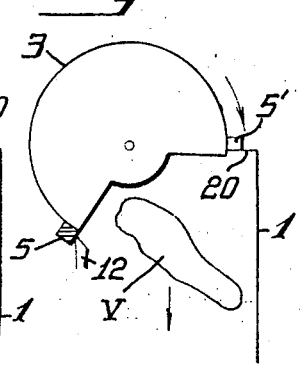 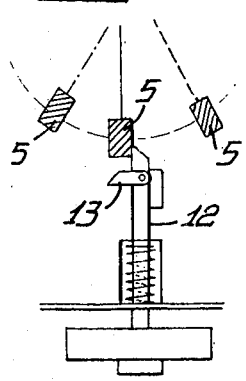
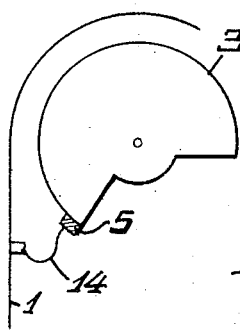 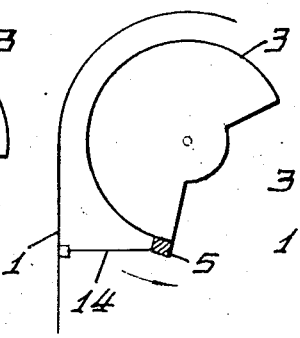 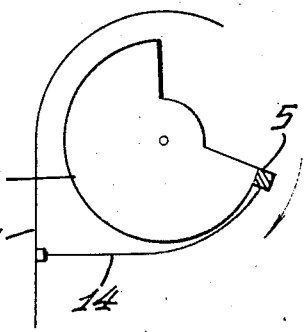

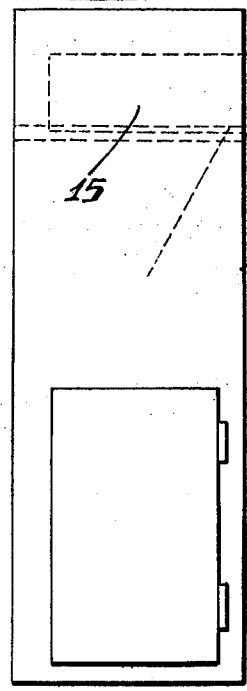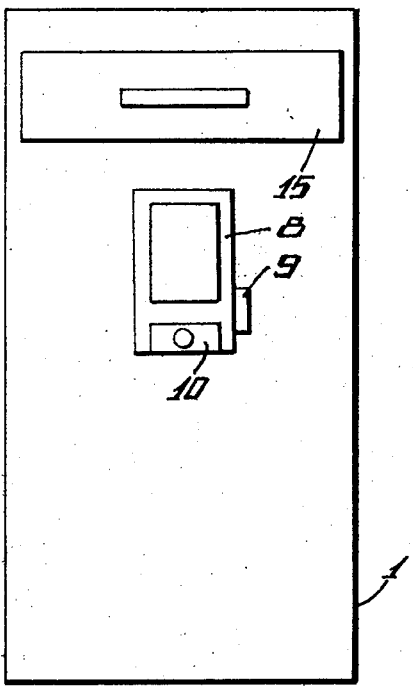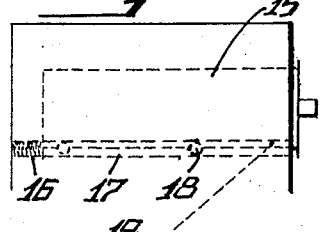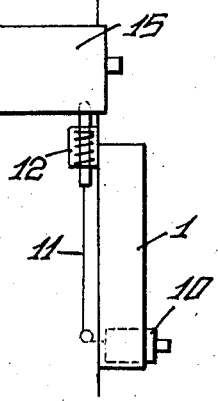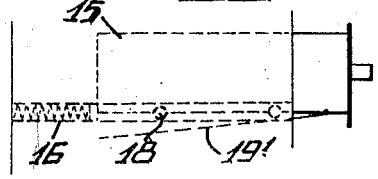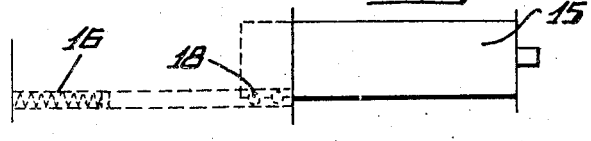

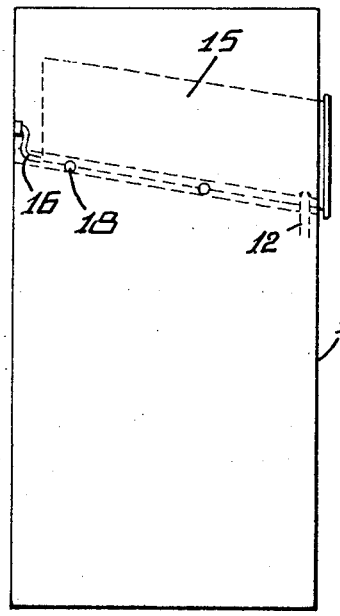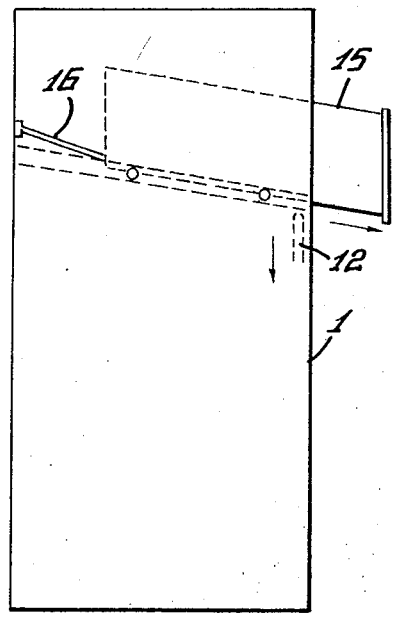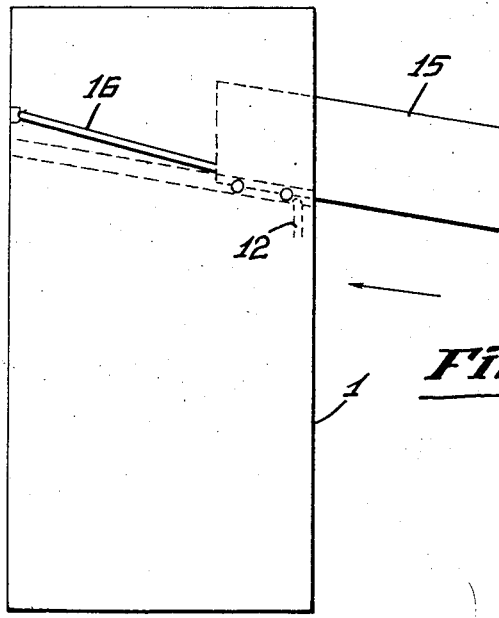

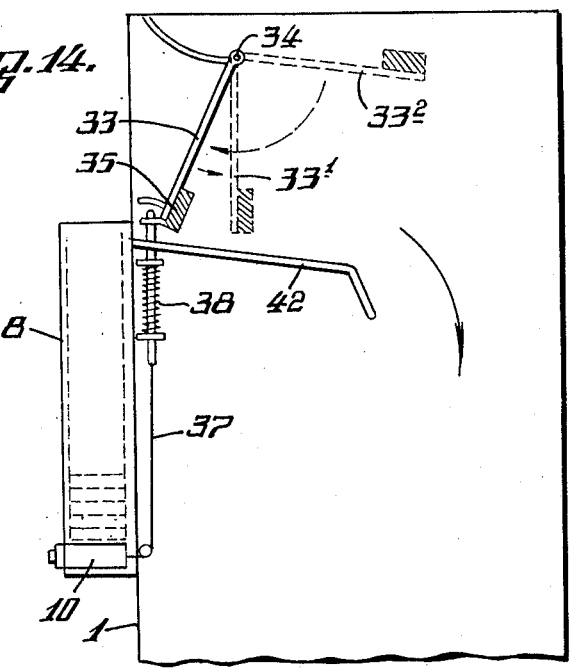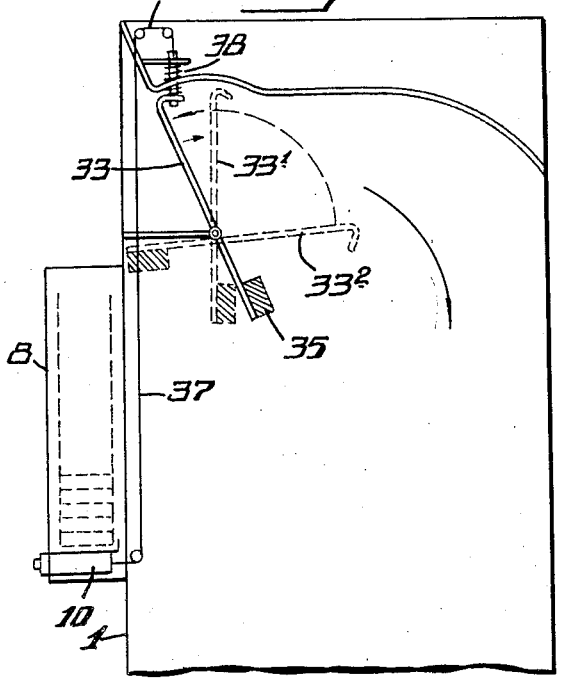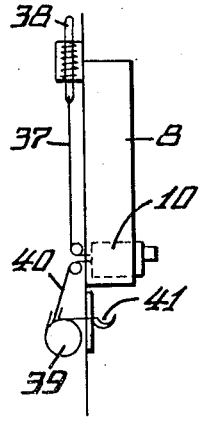

United States Patent Office 2,986,328
Patented May 30, 1961

2,986,328
APPARATUS FOR THE COLLECTION AND PICKING-UP OF ARTICLES ENTRUSTED FOR SERVICES
Jeanne Francoise Louise Delas, 19 Rue Deville, Toulouse, France
Filed Aug. 19, 1958, Ser. No. 756,009
Claims priority, application France Aug. 20, 1957
2 Claims. (Cl. 232—43.1)

The present invention relates to apparatus which permits the collection and picking-up of articles entrusted to tradesmen, artisans and the like.

An object of the invention is to provide apparatus which will fulfil the following conditions:

(a) It should be possible to deposit only a single article at a time;

(b) It should not be possible to take away articles previously deposited by other persons or to take back one's own deposited article;

(c) It should provide protection against the risk of malevolence (for example, the depositing of filth or of soiling or corrosive products).

With a view to achieving this object, apparatus of the invention is characterized essentially by the fact that it comprises, a chest intended for receiving the articles to be collected, a member for introducing the article, which is brought into the position of opening on the introduction of the article and which is then closed in order to allow the article to drop and to be deposited in the chest, and an automatic distributor intended, on the one hand, to deliver, in exchange for one or more coins, a package for the articles to be deposited as well as a ticket or tickets or marks or counter marks and, on the other hand, to insure the freeing of the introducing member.

A number of embodiments will hereinafter be described with reference to the accompanying drawings, in which:

Figures 7, 7A, 7B, 7C and 7D are explanatory views of the operation of the introducing member constituted by a disappearing pivoting cylinder;

Figure 8 is a detailed view of a portion of the apparatus;

Figures 9, 9A and 9B relate to a modified construction of this member;

Figures 10, 11, 11A, 11B, 11C, 12, 13, 13A, and 13B relate to a modification of which the aforesaid cylinder is replaced by a sliding drawer;

Figures 14–16 illustrate further modifications contemplated by the invention.

Figure 1:
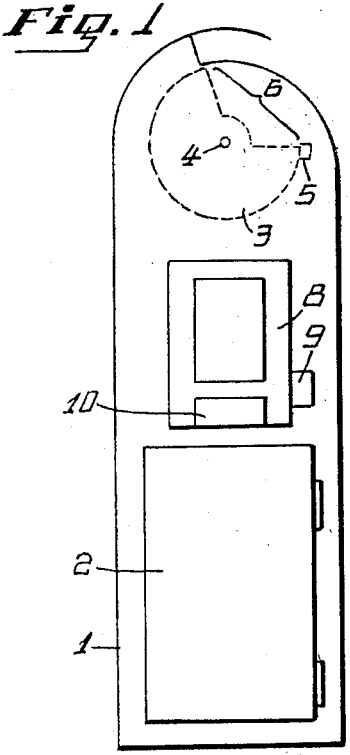
Figure 1 is a front elevation and Figure 2 is a side elevation of apparatus provided in accordance with the invention.
Figure 2:
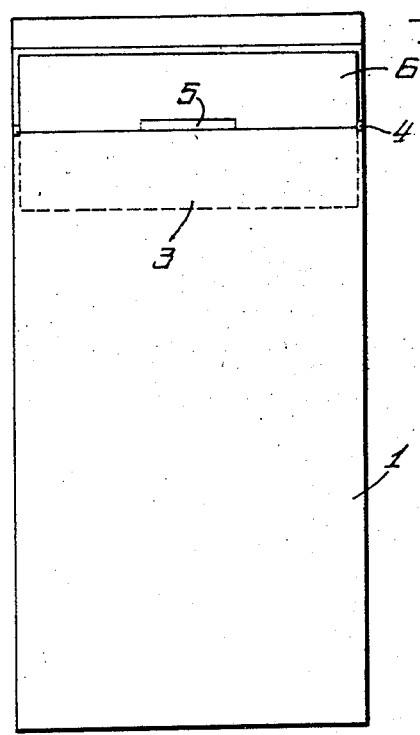
Figure 3:
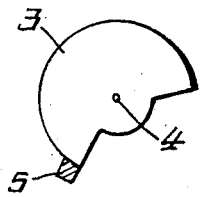
Figures 3, 4, 5 and 6 are detailed views of elements of the apparatus of Figures 1 and 2.
Figure 4:
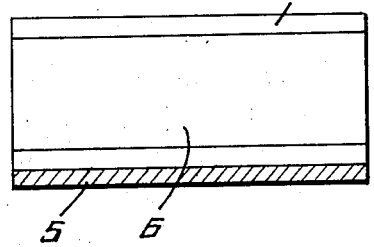
Figure 5:
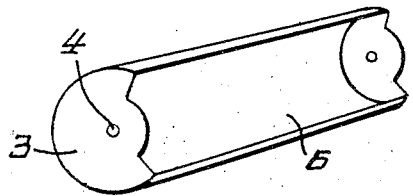
Figure 6:
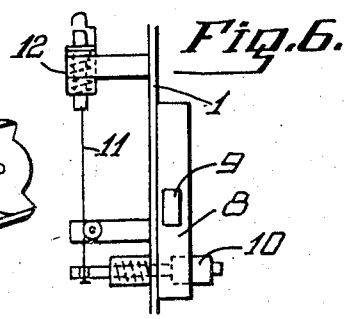

In the embodiment shown in Figures 1 to 7, the apparatus comprises a chest 1 which is provided with a door 2 and inside which there is located a cylinder 3 mounted on axles 4 which permit rotation in the chest 1.

This cylinder, the inside of which is hollow, is provided with a counterweight 5 and comprises an opening 6 provided substantially over its axial extent, leaving the cylinder open over about one-third of its circumference.

The counterweight 5 is arranged along the length of the cylinder in such a manner that the cylinder 3 is urged thereby towards a position of closure, the opening 6 being then directed towards the bottom of the chest (Figure 7).

A catch 5' comes, in the position shown in Figure 7, into abutting contact with a part 20 of the chest 1.

The apparatus is provided with an automatic distributor 8 of conventional type which comprises a money receptacle 9 and a drawer 10 which delivers a wrapper for the article to be deposited, the drawer being connected by a cable 11, to a spring bolt 12 which keeps the cylinder 3 in the position shown in Figure 7. This bolt terminates in a hinged latch 13 (Figure 8).

The operation is as follows:

With one or more coins arranged in the receptacle 9, the customer pulls the drawer 10 out and receives a box or an envelope containing a bag made of a material (for example, polyethylene) which is insensitive to chemical agents and to moisture. He also receives two tickets (mark and counter-mark) or a single ticket corresponding to the number printed on the bag.

By pulling out the drawer, the customer acts through the cable 11 and the bolt 12 (Figure 6) to release the cylinder 3 which, under the action of the counterweight 5, assumes the position shown in Figure 7A and which thus is partially opened.

The customer puts the article of clothing into the bag, closes the bag and brings the cylinder 3 into the position where at it is completely open (Figure 7B).

This position is reached when the counterweight 5 meets the part 20 of the chest 1.

As the cylinder 3 is then completely open, the customer can deposit his article of clothing or the like through the opening 6 into the space available inside the cylinder 3 and the cylinder, which is urged to rotate by its counterweight 5, tries to resume its position of equilibrium, passes beyond it, acts on the hinged latch 13 of the bolt (Figure 8) and is held in its locked position.

Figures 7 to 7D illustrate the following positions:

Figure 7: locking by the bolt 12 and closing the interior space in the chest;

Figure 7A: disengagement of the bolt 12, return of the counterweight 5 to the position of equilibrium;

Figure 7B: complete opening of the internal space of the cylinder for depositing of the article of clothing;

Figure 7C: rotation of the cylinder 3 towards the position of closure; and

Figure 7D: engagement of counterweight 5 and the dropping of the article of clothing V.

If a more rapid and powerful closing is desired, there may be provided, between the back face of the chest 1 and the counterweight 5, springs 14 (Figures 9, 9A and 9B) of such length that they come into action only after the position shown in Figure 9A.

Figure 9A shows a position which corresponds to the position shown in Figure 7A, and Figure 9B shows a position which corresponds to the position shown in Figure 7B.

Various modifications will hereinafter be described which are suitable for picking up small articles such as, for example, shirts.

The cylinder indicated above can, for example, be replaced by a drawer 15 which is urged forward by springs 16 (Figures 10 and 13).

Pulling on the drawer 10 disengages the bolt 12 (Figure 12) and releases the drawer 15 which, under the action of the springs 16, is brought into the position of partial opening (Figure 11B) by moving on rails 17 with rollers 18.

The movable bottom 19, which occupied the position shown in Figure 11A, is raised (position 19' of Figure 11B) while the bolt 12 remains locked by the said bottom.

On complete opening (Figure 11C), the bottom is horizontal.

The customer then deposits the article and pushes the drawer back thus compressing the springs 16, and leaving a passage for the introduction of the bolt into its stop hole; this also brings, by means of the cable 11, the drawer 10 of the distributor back to its initial position.

This semi-automatic modification may be made entirely automatic if the drawer 15 is mounted on forwardly slipping rails (Figures 13, 13A and 13B) and is kept, by springs 16 on the disengagement of the bolt, an advance which is sufficient for locking the latter beneath the movable bottom. The drawer is then pulled by hand, thus producing the tensioning of the springs 16 (Figure 13B) with a starting speed which is sufficient for the drawer, although movable on rails, to rise again, when the grip is relaxed, into its position of fastening (Figure 13).

In Figures 11 to 13, the bottom is, during the depositing of the article, retained in position by the opening rim of the chest; this bottom swings into the position of closure while dropping the entrusted article.

As can be seen, the apparatus fulfils the following conditions:

(1) A single article can be introduced therein at a time;

(2) Nothing can be gained by putting a number of articles of clothing into the same bag because only a single checking ticket can be placed therein;

(3) The article is protected by the polyethylene bag;

(4) It is impossible to withdraw articles of clothing which have already dropped into the chest, since, after opening, access can be had only to the interior of the cylinder or of the drawer;

(5) Automatic closures are provided for guarding against the carelessness of certain customers;

(6) The working cost is covered, wholly or partly, at the actual depositing of the article;

(7) The troublesome opening of the apparatus provides a guarantee against interference by children or practical jokers.

Finally, the mechanical simplicity renders possible a reasonable selling price so that a large number of picking-up stations can be contemplated.

In the embodiment shown in Figure 14, there is provided an opening panel 33 which is equipped with a counterweight 35 and mounted so as to be able to pivot round an axle 34 situated towards the top of this chest.

This pivoting takes place above a stationary guide 42.

The drawer 10 of the distributor 8 is connected, by a cable 37, to a spring bolt 38 which keeps the panel 33 in the position represented by full lines.

If a pull is exerted on the drawer 10, the panel 33 is released. Urged by the counterweight 35, the panel 33 takes up the position of equilibrium indicated by the vertical line 33′, thus producing a preliminary opening.

On the introduction of the filled bag, the panel is pushed back into its end position $33^2$. From this latter position, it drops back by gravity, passing the position of equilibrium, and is made fast by the bolt 38 thus resuming the position of closure 33.

The operation is the same in the case of Figure 15, in which the panel, instead of being hinged upwardly, is mounted so as to pivot downwards.

In the embodiment shown in Figure 16, the distributor 8 of any known type distributes, by its drawer 10, bags made of polyethylene and an elastic material. At that instant, the handle of the distributor, which effects the simultaneous opening of a coin apparatus of known type and by a cable 37 and a spring bolt 38, the opening of the chest, also effects simultaneously the distribution of a ticket.

For this distribution of the ticket, use is made of any known distributing apparatus such as, for example, of the type used in cinemas, in which the tickets are rolled up into a roll 39, the rotation of the roll by a cable 40, for example, causing a ticket to issue at 41.

What I claim is:

1. Collection apparatus comprising a chest for the collecting and storing of an article, said chest being provided with an opening for the deposit of said article, a cylinder provided with an opening, and a shaft supporting said cylinder in said chest so that the opening of said cylinder can be made to correspond with the opening of said chest, the said cylinder having at least two positions in one of which said article can be deposited in said cylinder through said opening in the chest and in the other of which the cylinder blocks the opening in said chest and opens into said chest, distributor means adapted to dispense a packing for said article, and coupling means between said cylinder and said distributor means and responsive to the latter so that, when said packing is distributed, the cylinder is put into the position whereby the article may be deposited in the same.

2. Collection apparatus comprising a chest for the collecting and storing of an article, said chest being provided with an opening for the deposit of said article, a cylinder provided with an opening, and a shaft supporting said cylinder in said chest so that the opening of said cylinder can be made to correspond with the opening of said chest, the said cylinder having at least two positions in one of which said article can be deposited in said cylinder through said opening into said chest, distributor means adapted to dispense a packing for enveloping said article, the said distributor means comprising a drawer which delivers the packing, a cable to provide a connection between said drawer and the cylinder, latching means connected to the cable and adapted to maintain the cylinder in the position whereat the cylinder blocks the opening in the chest, movement of the drawer moving the cable and latch so that, when the said packing is distributed, the cylinder is put into the position in which the article may be deposited.

References Cited in the file of this patent

UNITED STATES PATENTS

| | | |
|---|---|---|
| 494,050 | Anderson | Mar. 21, 1893 |
| 2,105,442 | Murtaugh | Jan. 11, 1938 |
| 2,599,722 | Rourke | June 10, 1952 |
| 2,769,516 | Hensley | Nov. 6, 1956 |